United States Patent
Lindberg et al.

(10) Patent No.: US 11,624,411 B2
(45) Date of Patent: Apr. 11, 2023

(54) ACTIVE AERODYNAMICS NON-BACKDRIVEABLE CLUTCH DEVICE

(71) Applicant: Magna Exteriors Inc., Concord (CA)

(72) Inventors: Braendon R. Lindberg, Metamora, MI (US); Anthony J. Povinelli, Romeo, MI (US); Martin R. Matthews, Troy, MI (US); Yao Wang, Troy, MI (US)

(73) Assignee: MAGNA EXTERIORS, INC., Concord (CA)

( * ) Notice: Subject to any disclaimer, the term of this patent is extended or adjusted under 35 U.S.C. 154(b) by 0 days.

(21) Appl. No.: 17/433,729

(22) PCT Filed: Mar. 6, 2020

(86) PCT No.: PCT/US2020/021376
§ 371 (c)(1),
(2) Date: Aug. 25, 2021

(87) PCT Pub. No.: WO2020/181185
PCT Pub. Date: Sep. 10, 2020

(65) Prior Publication Data
US 2022/0136571 A1     May 5, 2022

Related U.S. Application Data

(60) Provisional application No. 62/815,078, filed on Mar. 7, 2019.

(51) Int. Cl.
*F16D 41/06* (2006.01)
*F16D 41/066* (2006.01)
*B62D 35/00* (2006.01)

(52) U.S. Cl.
CPC ........... *F16D 41/066* (2013.01); *B62D 35/00* (2013.01)

(58) Field of Classification Search
CPC . F16D 41/066–067; F16D 41/086–105; F16D 7/021–022; F16D 43/211
USPC ....................................................... 192/223.2
See application file for complete search history.

(56) References Cited

U.S. PATENT DOCUMENTS

| | | | |
|---|---|---|---|
| 7,032,731 B2* | 4/2006 | Kim | B60N 2/167 192/223.2 |
| 7,163,097 B2* | 1/2007 | Acosta | F16D 43/02 192/223.2 |
| 7,832,542 B2* | 11/2010 | Byun | F16D 41/066 192/223.2 |
| 2005/0189189 A1* | 9/2005 | Acosta | F16D 43/02 192/223.2 |
| 2008/0179156 A1* | 7/2008 | Byun | F16D 41/066 192/45.1 |

FOREIGN PATENT DOCUMENTS

WO    WO-2016028196 A1 *   2/2016   ........... A01D 34/905

* cited by examiner

*Primary Examiner* — David R Morris
(74) *Attorney, Agent, or Firm* — Warn Partners, P.C.

(57) ABSTRACT

A non-backdrivable clutched module for a bi-directional actuator such as actuators used for active aerodynamics on vehicles. The module has both a stopper mode and a clutch mode. During the stopper mode a back-driving force gets diverted away from the actuator using a locking bearing member. If the force is too great a clutch mode will disengage the back-driving force completely from the shaft connected to the actuator, thereby preventing damage to the actuator.

17 Claims, 5 Drawing Sheets

US 11,624,411 B2

ACTIVE AERODYNAMICS NON-BACKDRIVEABLE CLUTCH DEVICE

FIELD OF THE INVENTION

The present invention relates to a non-backdrivable clutched module for a bi-directional actuator such as actuators used for active aerodynamics on vehicles.

BACKGROUND OF THE INVENTION

Design a device that can transfer a torque applied from the input drive to the output drive but not transfer torque from the output drive back to the input drive. The output drive should also be able to decouple itself from the input drive for large torque input to protect the system. Additionally, the device should also transfer output shaft vibration and impact loads to the device structure and not through the input drive, protecting the actuator. During an impact, the output shaft would decouple, once the load is removed, the device should return to a designated position through mechanical solutions and not require electrical position sensors.

SUMMARY OF THE INVENTION

The present invention is directed to a non-backdrivable clutched module for a bi-directional actuator. The non-backdrivable module includes a housing having an inside surface. The housing is connectable to an actuator that is external to the housing. Within the housing there is an inside surface that forms a cavity. Partially disposed in the cavity of the housing is an input shaft cog with a shaft portion extending out of the housing, the shaft portion being connected to an actuator external to the housing. The input shaft cog also has a cog portion rotatably positioned in the housing. The cog portion includes a plurality of bearing recesses and a plurality of drive recesses each having a first side, second side, third side and fourth side. The first side and second side of each of the plurality of bearing recesses and plurality of drive recesses are formed by one of a plurality of teeth extending from the surface of the cog portion and the third side is defined by the inside surface of the housing;

The module also has a clutched output shaft having a shaft portion extending out of the housing, the shaft portion being connected to a device being driven by the actuator. The clutched output shaft also has a clutch cog receiving portion rotatably positioned within the cavity of the housing.

The module further includes a clutch cog between the input shaft cog and the clutched output shaft. The clutch cog has both a resilient connection and a detent connection to the clutch cog portion of the clutched output shaft. The clutch cog has a stopper mode where the clutch cog acts on at least one bearing member between the clutch cog and the housing and locks the clutch cog to prevent the clutch cog from moving the input shaft cog. The clutch cog also has a clutch mode that disengages the clutch cog from the clutched output shaft.

Further areas of applicability of the present invention will become apparent from the detailed description provided hereinafter. The detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
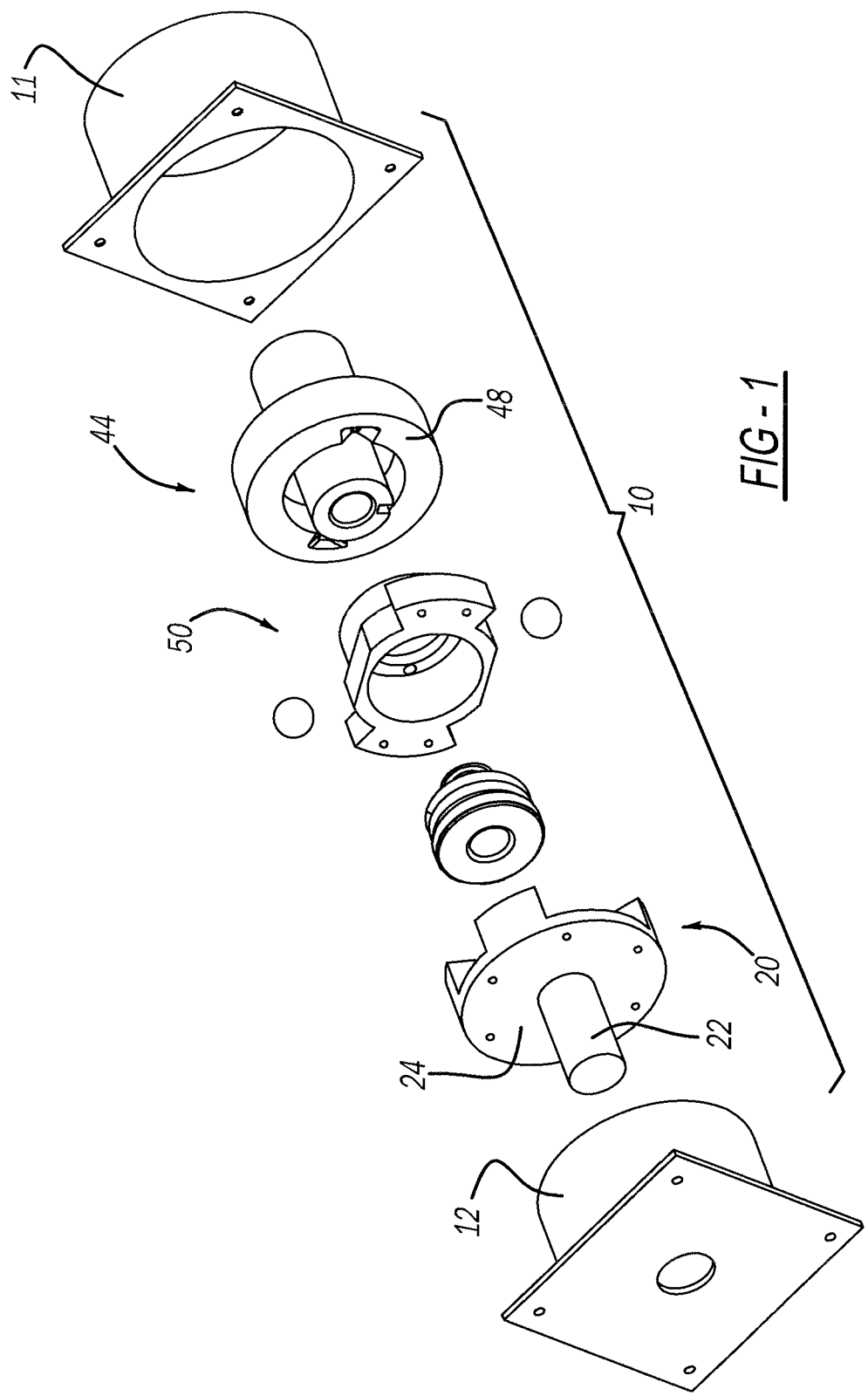
FIG. 1 is an exploded isometric top view of a non-backdrivable clutched module for a bidirectional actuator.
Figure 2:
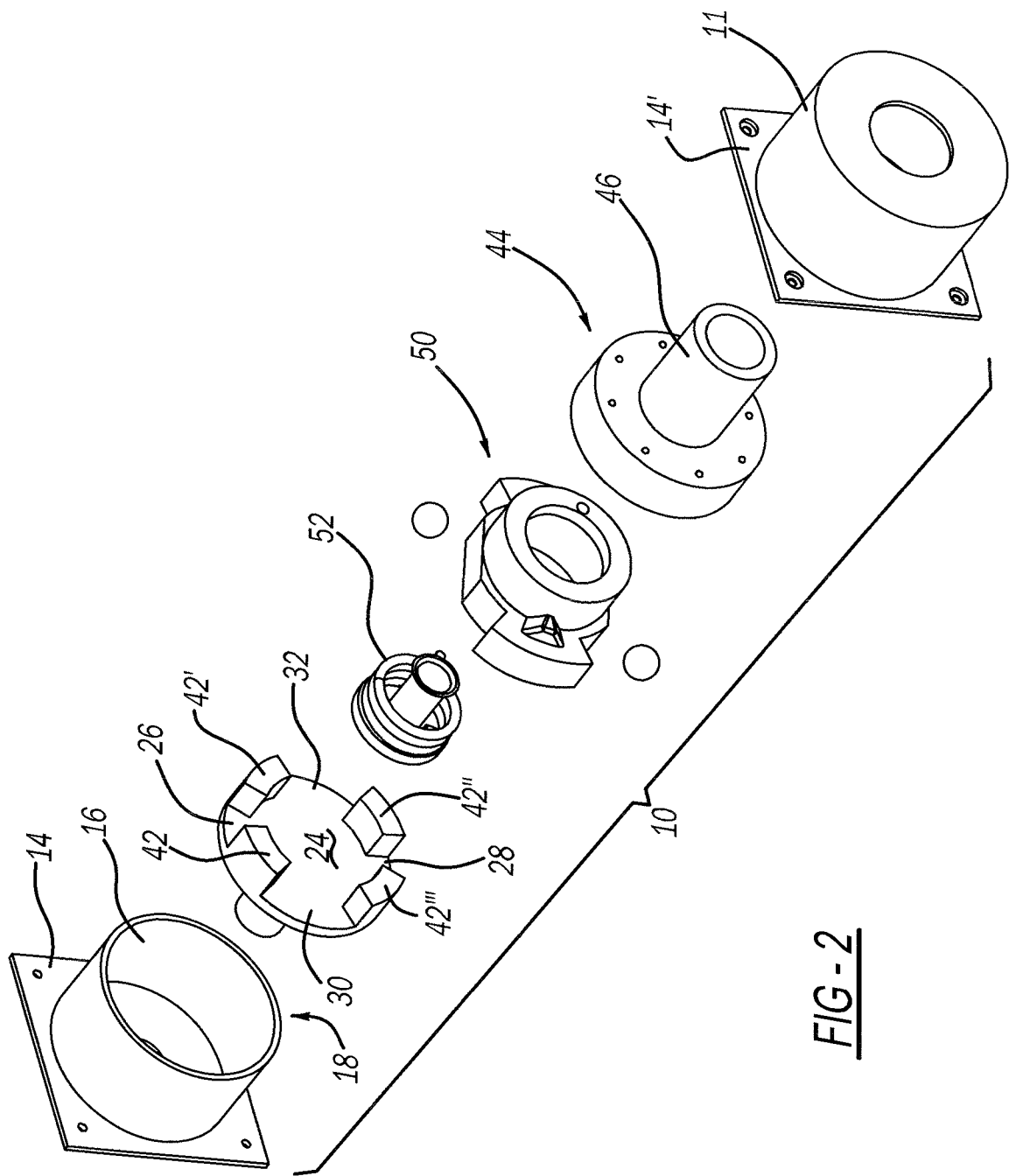
FIG. 2 is second exploded isometric top view of the non-backdrivable clutched module for a bidirectional actuator.
Figure 3:
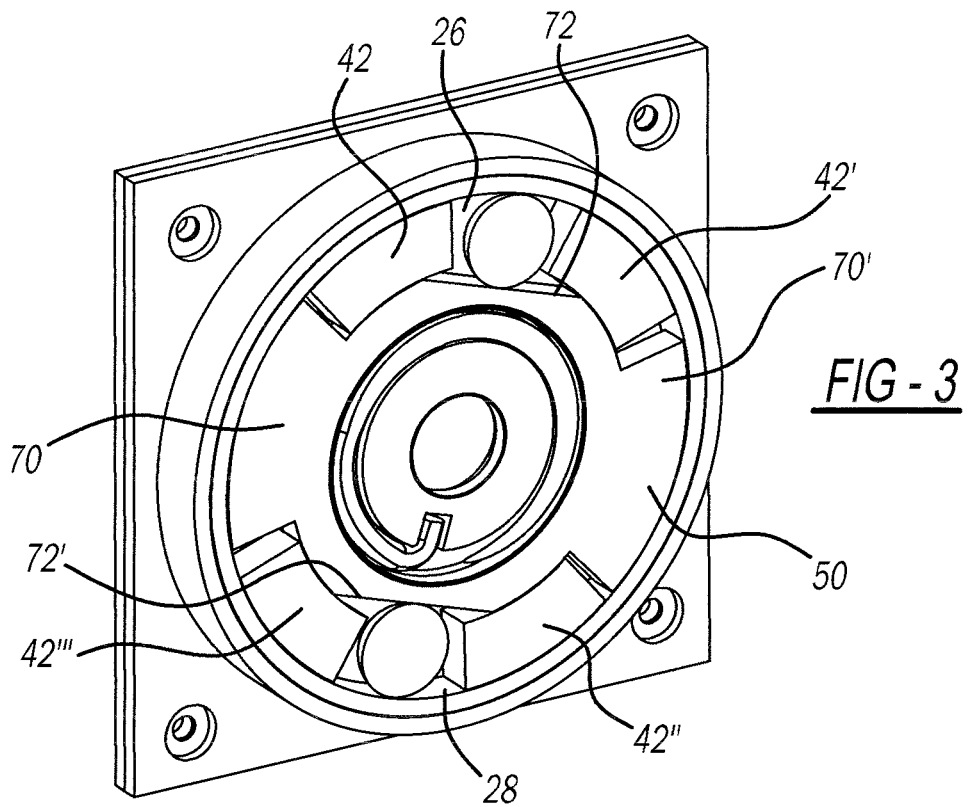
FIG. 3 is a cross-sectional side isometric view of the non-back drivable clutched module.
Figure 4:
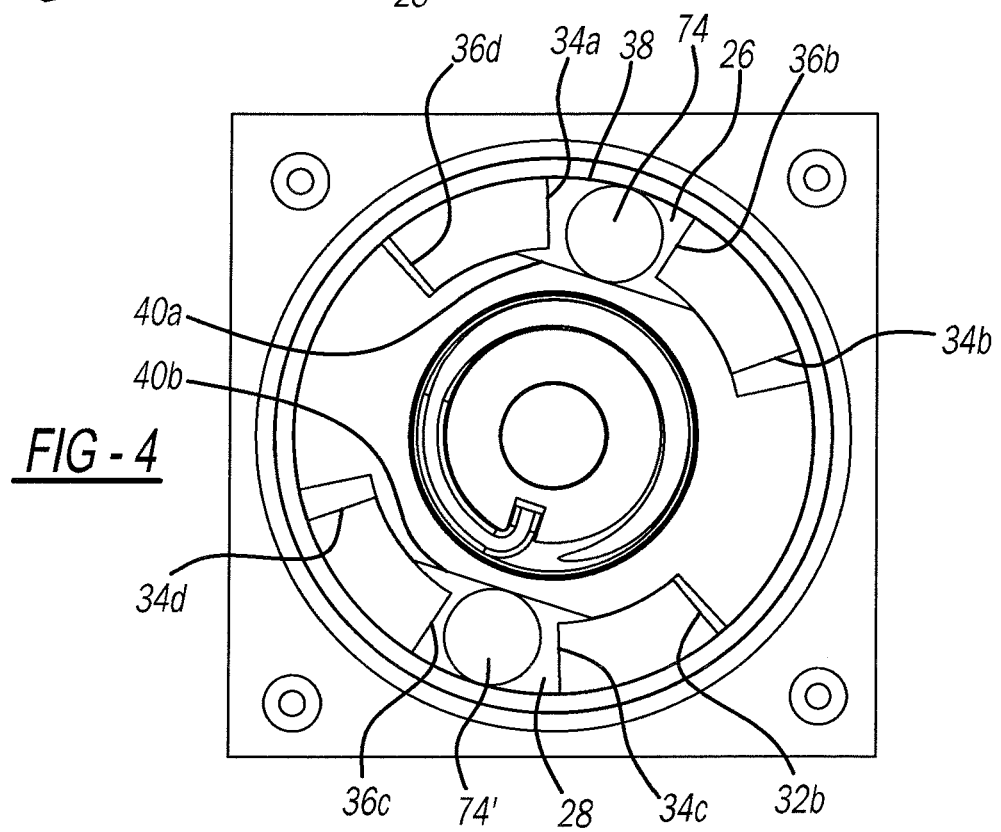
FIG. 4 is a cross-sectional side plan view of the non-back drivable clutched module.
Figure 5:
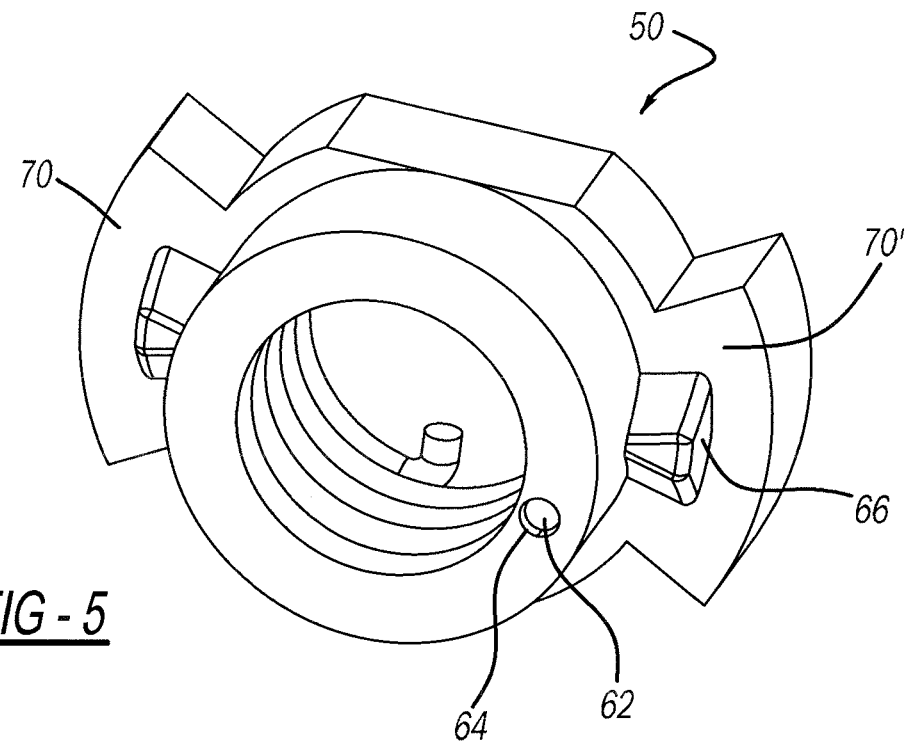
FIG. 5 is a side isometric view of a clutch cog according to the present invention.
Figure 6:
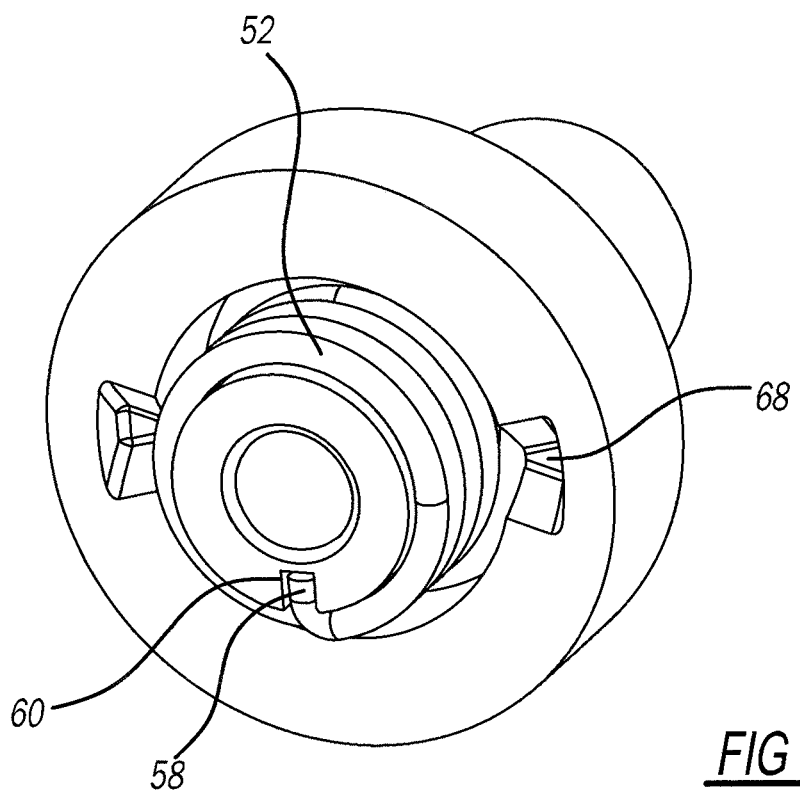
FIG. 6 is a side isometric view of a clutched output shaft with spring element connected according to the present invention.

The following description of the preferred embodiment(s) is merely exemplary in nature and is in no way intended to limit the invention, its application, or uses.

Referring to the Figures, the present invention is directed to a non-backdrivable clutched module or module 10 for a bi-directional actuator. The module 10 includes a housing with a body piece 12 and a cover piece 11 each having mounting flanges 14, 14' to connect to the housing to the bi-directional actuator 13 that is external to the components of the module 10. While the module 10 is described as separate from the actuator 13, it is within the scope of this invention for the module to be integrated into an actuator 13. The body piece 12 includes an inside surface 16 that forms a cavity 18 for containing portions of the other components of the module 10.

Partially disposed in the cavity 18 of the housing 12 is an input shaft cog 20 with a shaft portion 22 extending out of the housing 12 and connected to the actuator 13 external to the housing 12. The input shaft cog 20 also has a cog portion 24 rotatably positioned in the housing 12. The cog portion 24 includes a plurality of bearing recesses 26, 28 and a plurality of drive recesses 30, 32 each having a first side 34*a-d*, second side 36*a-d*, third side 38 and fourth side 40*a*, 40*b*. The first side 34*a-d* and second side 36*a-d* of each of the plurality of bearing recesses 26, 28 and plurality of drive recesses 30, 32 are formed by one of a plurality of teeth 42, 42', 42", 42'" extending from the surface of the cog portion 24 and the third side 38 is defined by the inside surface 16 of the housing 12.

Figure 7:
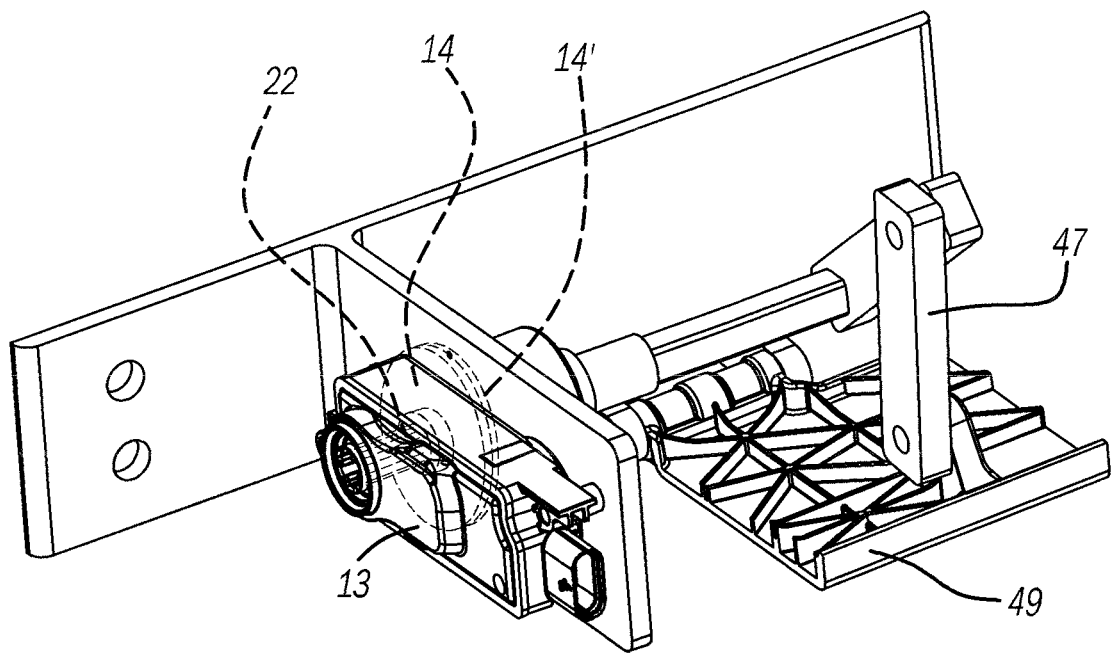
FIG. 7 is a side perspective view of a clutch cog connected to an actuator of a device.
Figure 8:
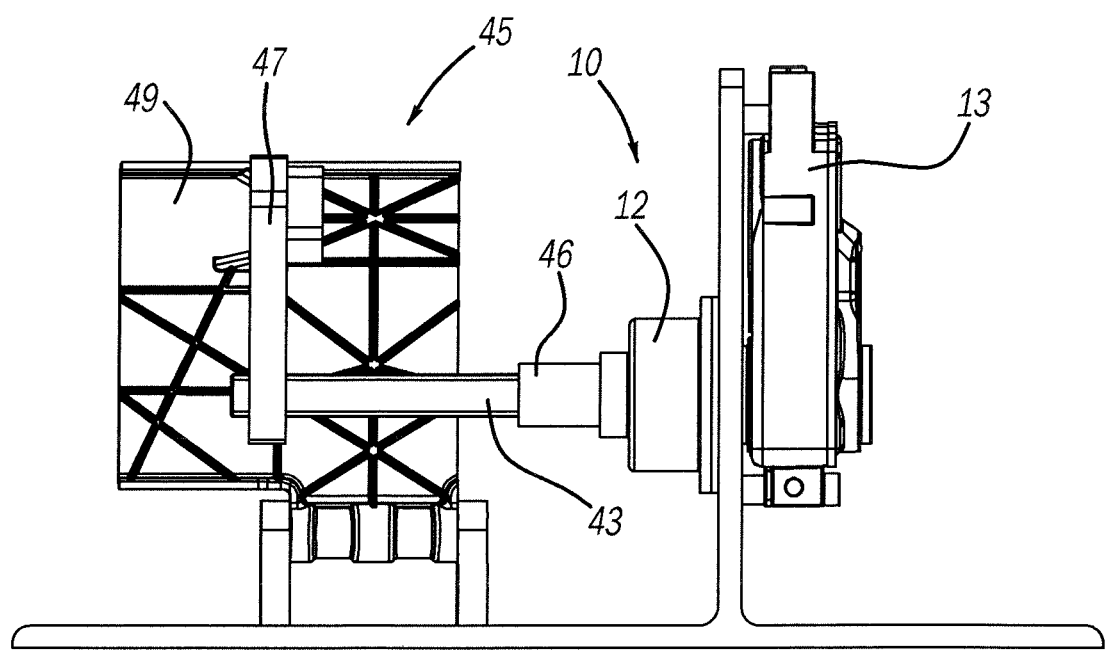
FIG. 8 is an overhead plan view of a clutch cog connected to an actuator or a device.

The module 10 also has a clutched output shaft 44 having a shaft 46 portion extending out of the housing 12 and connected to a device 45 being driven by the actuator 13. As shown in FIGS. 7 and 8 the device 45 being driven is an active aerodynamic system, more specifically an air dam and the shaft 46 connects to a torque transfer tube 43 that connects to a linkage then moves a deflector 49 between a deployed position and undeployed position. While the device 45 is shown part of an active aerodynamic system it is within the scope of this invention for the module 10 to be used in any system where there is concern damage from back driving forces. Examples of devices include, moveable spoiler actuators, active air dam actuators, active tire spat actuators, active D-pillar actuators, liftgate actuators, side view mirrors actuators, window actuators, retractable running board actuators, sliding doors actuators and seat actuators.

The clutched output shaft 44 also has a clutch cog receiving portion 48 rotatably positioned within the cavity 18 of the housing 12.

The module 10 further includes a clutch cog 50 positioned between the input shaft cog 20 and the clutched output shaft 44. The clutch cog 50 has both a resilient connection 52 and a detent connection with the clutch cog receiving portion 48 of the clutched output shaft 44. The resilient connection 52 is depicted as a spring that has a first end 58 that connects to a slot 60 in the clutch cog receiving portion 48 and a second end 62 that is connected to a hole 64 in the clutch cog 50. The type of spring used can vary depending on the particular application. In the current embodiment of the invention the spring is a coil spring. However, it is within the scope of the invention for other springs to be used such as wave spring, coil spring and combinations thereof. The detent connection is provided by detent projections 66 on the clutch cog 50 that engage detent recesses 68 formed on the surface of the clutch cog 50 receiving portion 48 of the clutched output shaft 44. The clutch cog 50 also includes a plurality of teeth 70, 70' of the clutch cog 50. Each one of the plurality of teeth 70, 70' are configured to mate with and engage one of the plurality of drive recesses 30, 32 of the input shaft cog 20. When the input shaft cog 20 rotates in response to torque from the actuator through the shaft portion 22, the plurality of teeth 42, 42', 42'', 42''' of the input shaft cog 20 will press against the plurality of teeth 70, 70' to transfer rotational force that gets transmitted to the clutched output shaft 44.

A plurality of flat surfaces 72, 72' of the clutch cog 50 also had a plurality of flat surfaces 72, 72' configured to form the fourth side 40a, 40b of a respective one of the plurality of bearing recesses 26, 28. A bearing 74, 74' is positioned in each one of the plurality of bearing recesses 26,28. The figures depicts a ball bearing however, it is within the scope of this invention for the bearing 74, 74' to be a different type of bearing such as a cylindrical roller bearing, conical bearing or double end tapered bearing.

The module 10 has a stopper mode and a clutch mode. The stopper mode occurs where upon a first back drive force being applied to the clutched output shaft 44. The clutch cog 50 is stopped from transmitting backdriving force to the actuator through the input shaft cog 20. This happens by forces acting on the clutched output shaft 44 rotating the clutched cog 50 so that the plurality of teeth 70, 70' of the clutch cog 50 rotate away and disengage the plurality of teeth 42, 42', 42'', 42''' of the input shaft cog 20. During this rotational movement the plurality of flat surfaces 72, 72' forming the fourth wall 40a, 40b of the respective plurality of bearing recesses 26, 28, act against the bearing 74, 74' in the respective bearing stop recess 26, 28 so that each bearing 74, 74' in the plurality of bearing recesses 26, 28 is locked between the fourth wall 40a, 40b and the third wall 38, which is the inside surface 16 of the housing 12, thereby preventing the back drive force from being transmitted to the input shaft cog 20. Thus, the back-driving force is diverted away from the input shaft cog 20 to the housing 12, which prevents the actuator from back driving and acts to stop or hold the clutched output shaft 44 in place.

The input shaft cog 20 and clutched output shaft 44 have geometry that allow for a friction locking when the torque is applied from the input shaft cog 20. The friction force is generated between the output shaft cog and the bearing which can be a cylinder, sphere, conical roller, sprocket or other suitable element that gets locked up against the inside surface or outer race wall of the housing. Once the friction force is equal to the normal force between the output shaft cog generated by the angle produced during the rotation caused by the applied torque, the system is unable to be back driven. Geometry on the input shaft cog does not allow the cylinder to create such friction forces on the outer race and thus transfers the torque to the output shaft. Various shapes and springs can be used to tune performance such as to limit the free play or backlash of the system or to tune the engagement timing of the various functions.

However, if the second driving force that is greater than the first back driving force acts on the clutched output shaft 44 is too great, the module 10 has a clutch mode. Clutch mode will occur when the second back drive force is enough to overcome the resilient connection between the clutched output shaft and the clutch cog. The clutched output shaft will disengage the detent connection between the clutched output shaft and clutch cog and the clutched output shaft will move freely against the force of the resilient connection, wherein upon cessation of the second back drive force the resilient connection causes the detent connection to reengage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A non-back drivable clutched module for an actuator comprising:
   a housing with an inside surface defining a cavity;
   an input shaft cog with a shaft portion extending out of the housing and connected to an external actuator, and a cog portion rotatably positioned in the cavity of the housing, wherein the cog portion includes a plurality of bearing recesses and a plurality of drive recesses each having a first side, second side, third side and a fourth side, where the first side and second side are each formed by one of a plurality of teeth extending from the surface of the cog portion and the third side is defined by the inside surface of the cavity of the housing;
   a clutched output shaft having a shaft portion extending out of the housing and connected to a device being driven by the actuator through the non-back drivable clutched module and a clutch cog receiving portion rotatably positioned within the cavity of the housing;
   a clutch cog between the input shaft cog and the clutched output shaft, where the clutch cog has both a resilient connection and a detent connection to the clutched output shaft;
   a plurality of flat surfaces of the clutch cog configured to form the fourth side of a respective one of the plurality of bearing recesses;
   a bearing positioned in each one of the plurality of bearing recesses;
   a stopper mode of the non-back drivable clutched module wherein upon a first back drive force being applied to the clutched output shaft, the clutch cog is stopped from transmitting back driving force to the actuator through the input shaft cog by moving the plurality of flat surfaces forming the fourth wall of the respective plurality of bearing recesses so that each bearing in the plurality of bearing recesses is locked between the fourth wall and the third wall, which is the inside surface of the housing, thereby preventing the back drive force from being transmitted to the input shaft cog, and a clutch mode where upon a second back drive force greater than the first back drive force and the second back drive force being sufficient enough to overcome the resilient connection between the clutched output shaft and the clutch cog, the clutched output shaft will disengage the detent connection between the clutched output shaft and clutch cog and the clutched output shaft will move freely against the force of the resilient connection, wherein upon cessation of the second back drive force the resilient connection causes the detent connection to reengage.

2. The non-back drivable clutched module of claim 1 further comprising:

a plurality of teeth of the clutch cog, where each one of the plurality of teeth are configured to mate with and engage one of the plurality of drive recesses of the input shaft cog.

3. The non-back drivable clutched module of claim 1 wherein the at least one bearing member is a ball bearing, roller bearing, conical bearing.

4. The non-back drivable clutched module of claim 1 wherein the resilient connection is a coil spring having a first end connected to the clutch cog and a second end connected to the clutched output shaft.

5. The non-back drivable clutched module of claim 1 wherein the resilient connection is one selected from the group comprising wave spring, coil spring and combinations thereof.

6. The non-back drivable clutched module of claim 1 wherein the device is one selected from the group consisting of moveable spoiler actuators, active air dam actuators, active tire spat actuators, active D-pillar actuators, liftgate actuators, side view mirror actuators, window actuators, retractable running board actuators, sliding doors actuators and seat actuators.

7. A non-back drivable clutched module for an actuator comprising:

a housing with an inside surface;

an input shaft cog with a shaft portion extending out of the housing and connected to an actuator external to the housing, and a cog portion connected to the shaft portion of the cog portion being rotatably positioned in the housing, wherein the cog portion includes a plurality of bearing recesses and a plurality of drive recesses each having a first side, second side, third side and fourth side, wherein the first side and second side of each of the plurality of bearing recesses and plurality of drive recesses are formed by one of a plurality of teeth extending from the surface of the cog portion and the third side is defined by the inside surface of the housing;

a clutched output shaft having a shaft portion extending out of the housing and connected to a device being driven by the actuator through the non-backdrivable clutched module and a clutch cog receiving portion rotatably positioned within the cavity of the housing; and a clutch cog between the input shaft cog and the clutched output shaft, where the clutch cog has both a resilient connection and a detent connection to the clutch cog receiving portion of the clutched output shaft, wherein the clutch cog has a clutch mode that disengages the clutch cog from the clutched output shaft and a stopper mode where the clutch cog acts on at least one bearing member between the clutch cog and the housing and locks the clutch cog to prevent the clutch cog from moving the input shaft cog.

8. The non-backdrivable clutched module of claim 7 wherein the at least one bearing member is a ball bearing, roller bearing, conical bearing.

9. The non-backdrivable clutched module of claim 7 wherein the resilient connection is a coil spring having a first end connected to the clutch cog and a second end connected to the clutched output shaft.

10. The non-backdrivable clutched module of claim 7 wherein the resilient connection is one selected from the group comprising wave spring, coil spring and combinations thereof.

11. The non-back drivable clutch module of claim 7 wherein the stopper mode occurs upon a first back drive force being applied to the clutched output shaft and the clutch mode further includes where upon a second back drive force greater than the first back drive force and the second back drive force being sufficient enough to overcome the resilient connection between the clutched output shaft and the clutch cog, the clutched output shaft will disengage the detent connection between the clutched output shaft and clutch cog and the clutched output shaft will move freely against the force of the resilient connection, wherein upon cessation of the second back drive force the resilient connection causes the detent connection to reengage.

12. The non-back drivable clutch module of claim 7 wherein the device is one selected from the group consisting of moveable spoiler actuators, active air dam actuators, active tire spat actuators, active D-pillar actuators, liftgate actuators, side view mirror actuators, window actuators, retractable running board actuators, sliding doors actuators and seat actuators.

13. A non-backdrivable clutched module for a bi-directional actuator comprising:

a housing with an inside surface defining a cavity;

an input shaft cog with a shaft portion extending out of the housing and connected to an external actuator, and a cog portion rotatably positioned in the cavity of the housing, wherein the cog portion includes a plurality of bearing recesses and a plurality of drive recesses each having a first side, second side, third side and a fourth side, where the first side and second side are each formed by one of a plurality of teeth extending from the surface of the cog portion and the third side is defined by the inside surface of the cavity of the housing;

a clutched output shaft having a shaft portion extending out of the housing and connected to a device being driven by the actuator through the non-backdrivable clutched module and a clutch cog receiving portion rotatably positioned within the cavity of the housing;

a clutch cog between the input shaft cog and the clutched output shaft, where the clutch cog has both a resilient connection and a detent connection to the clutched output shaft;

a plurality of teeth of the clutch cog, where each one of the plurality of teeth are configured to mate with and engage one of the plurality of drive recesses of the input shaft cog;

a plurality of flat surfaces of the clutch cog configured to form the fourth side of a respective one of the plurality of bearing recesses;

a bearing positioned in each one of the plurality of bearing recesses;

a stopper mode where upon a first back drive force being applied to the clutched output shaft, the clutch cog is stopped from transmitting backdriving force to the actuator through the input shaft cog by moving the plurality of flat surfaces forming the fourth wall of the respective plurality of bearing recesses so that each bearing in the plurality of bearing recesses is locked between the fourth wall and the third wall, which is the inside surface of the housing, thereby preventing the back drive force from being transmitted to the input shaft cog; and a clutch mode where upon a second back drive force greater than the first back drive force and the second back drive force being sufficient enough to overcome the resilient connection between the clutched output shaft and the clutch cog, the clutched output shaft will disengage the detent connection between the clutched output shaft and clutch cog and the clutched output shaft will move freely against the force of the resilient connection, wherein upon cessation of the second back drive force the resilient connection causes the detent connection to reengage.

14. The non-back drivable clutched module of claim 13 wherein the at least one bearing member is a ball bearing, roller bearing, conical bearing.

15. The non-back drivable clutched module of claim 13 wherein the resilient connection is a coil spring having a first end connected to the clutch cog and a second end connected to the clutched output shaft.

16. The non-back drivable clutched module of claim 13 wherein the resilient connection is one selected from the group comprising wave spring, coil spring and combinations thereof.

17. The non-back drivable clutched module of claim 13 wherein the device is one selected from the group consisting of moveable spoiler actuators, active air dam actuators, active tire spat actuators, active D-pillar actuators, liftgate actuators, side view mirror actuators, window actuators, retractable running board actuators, sliding doors actuators and seat actuators.

* * * * *